United States Patent
Miyazaki

[11] Patent Number: 6,138,728
[45] Date of Patent: Oct. 31, 2000

[54] HEAVY DUTY RADIAL TIRE INCLUDING BLOCKS HAVING ACUTE ANGLED CORNERS

[75] Inventor: Tatsuya Miyazaki, Akashi, Japan

[73] Assignee: Sumitomo Rubber Industries, Ltd., Hyogo-ken, Japan

[21] Appl. No.: 08/990,723

[22] Filed: Dec. 15, 1997

[51] Int. Cl.$^7$ .......................... B60C 11/03; B60C 107/00
[52] U.S. Cl. ....................... 152/209.15; 152/902
[58] Field of Search ............ 152/209 R, 209 D, 152/209.15, 209.18, 902

[56] References Cited

U.S. PATENT DOCUMENTS

| | | |
|---|---|---|
| 3,584,670 | 6/1971 | Verdier ..................................... 152/209 |
| 4,217,942 | 8/1980 | Takigawa et al. ................... 152/209 R |
| 4,345,632 | 8/1982 | Takigawa et al. ................... 152/209 R |
| 4,690,189 | 9/1987 | Bradisse et al. .................... 152/209 R |
| 5,109,903 | 5/1992 | Watanabe et al. ................... 152/209 R |
| 5,609,699 | 3/1997 | Himuro ............................... 152/209.15 |

FOREIGN PATENT DOCUMENTS

| | | | |
|---|---|---|---|
| 63-312204 | 12/1988 | Japan .................................. 152/209 R |
| 5-319026 | 12/1993 | Japan . | |

*Primary Examiner*—Steven D. Maki
*Attorney, Agent, or Firm*—Birch, Stewart, Kolasch & Birch, LLP

[57] ABSTRACT

A heavy duty radial tire including a tread portion which is provided with blocks having acute angled corners each defined between a pair of edge lines (3A and 3B) of the block, the acute angled corners being provided with a down slope which becomes steeper from the radially outside to the inside of the tire. Preferably, the size of the slope is 1 to 10 mm along the one edge line (3A), and 1 to 10 mm along the other edge line (3B), and 5 to 13 mm in the radial direction of the tire.

12 Claims, 8 Drawing Sheets

Fig.10
CONVENTIONAL
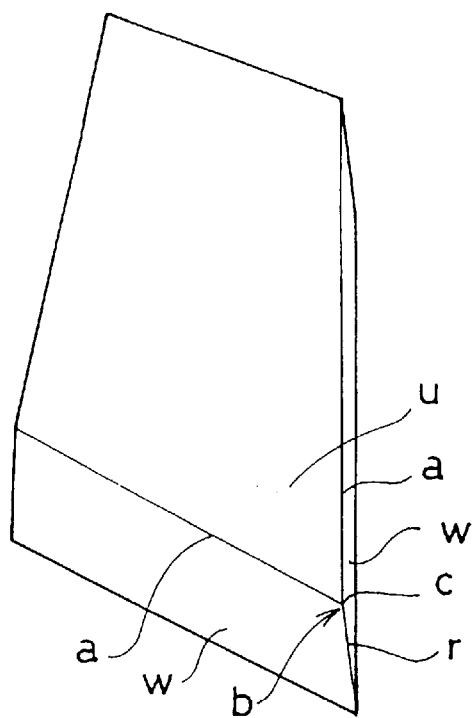

HEAVY DUTY RADIAL TIRE INCLUDING BLOCKS HAVING ACUTE ANGLED CORNERS

BACKGROUND OF THE INVENTION

The present invention relates to a pneumatic tire, more particularly to a heavy duty radial tire with an improved tread portion having resistance to uneven wear and tear-off and improved wet performance.

In heavy duty radial tires, e.g. truckbus tires which are required to display a large traction, relatively large size polygonal tread blocks are widely used. In such a tire, to improve running noise and wet performance, circumferential grooves and axial grooves are usually inclined. As a result, as shown in FIG. 10, acute angled corners (b) are necessarily formed on the tread blocks. The acute angled corners (b) are worn or torn off relatively easily, which becomes a staring point for uneven wear.

The convention manner to solve this problems of uneven wear is to cut off the corner (b) by a single down slope (e) as shown in FIGS. 11 and 12. However, if the cut-off rubber volume is large, wet performance and tire appearance or tread pattern's image become worse. On the other hand, if the cut-off rubber volume is small, the resistance to uneven wear and tear-off decreases. In the conventional manner, it is difficult to satisfy such irreconcilable requirements.

SUMMARY OF THE INVENTION

It is therefore, an object of the present invention to provide a heavy duty radial tire, in which the resistance to uneven wear and tear-off, wet performance, and appearance or the tread pattern's image are improved in a well balanced manner.

According to one aspect of the present invention, as illustrated in drawing FIG. 2, a heavy duty radial tire comprises a tread portion which is provided with blocks having acute angled corners each defined between a pair of edge lines (3A and 3B) of the block, characterized in that the acute angled corners are provided with a down slope which becomes steeper from radially outside to radially inside of the tire.

Preferably, the size of the slope is 1 to 10 mm when measured along the one edge line (3A), and 1 to 10 mm when measured along the other edge line (3B), and 5 to 13 mm when measured in the radial direction of the tire.

BRIEF DESCRIPTION OF THE DRAWINGS

Embodiments of the present invention will now be described in detail in conjunction with the accompanying drawings, wherein

FIG. 10 is a perspective view of a blocks having edged corners.

DETAILED DESCRIPTION OF THE INVENTION

Figure 1:
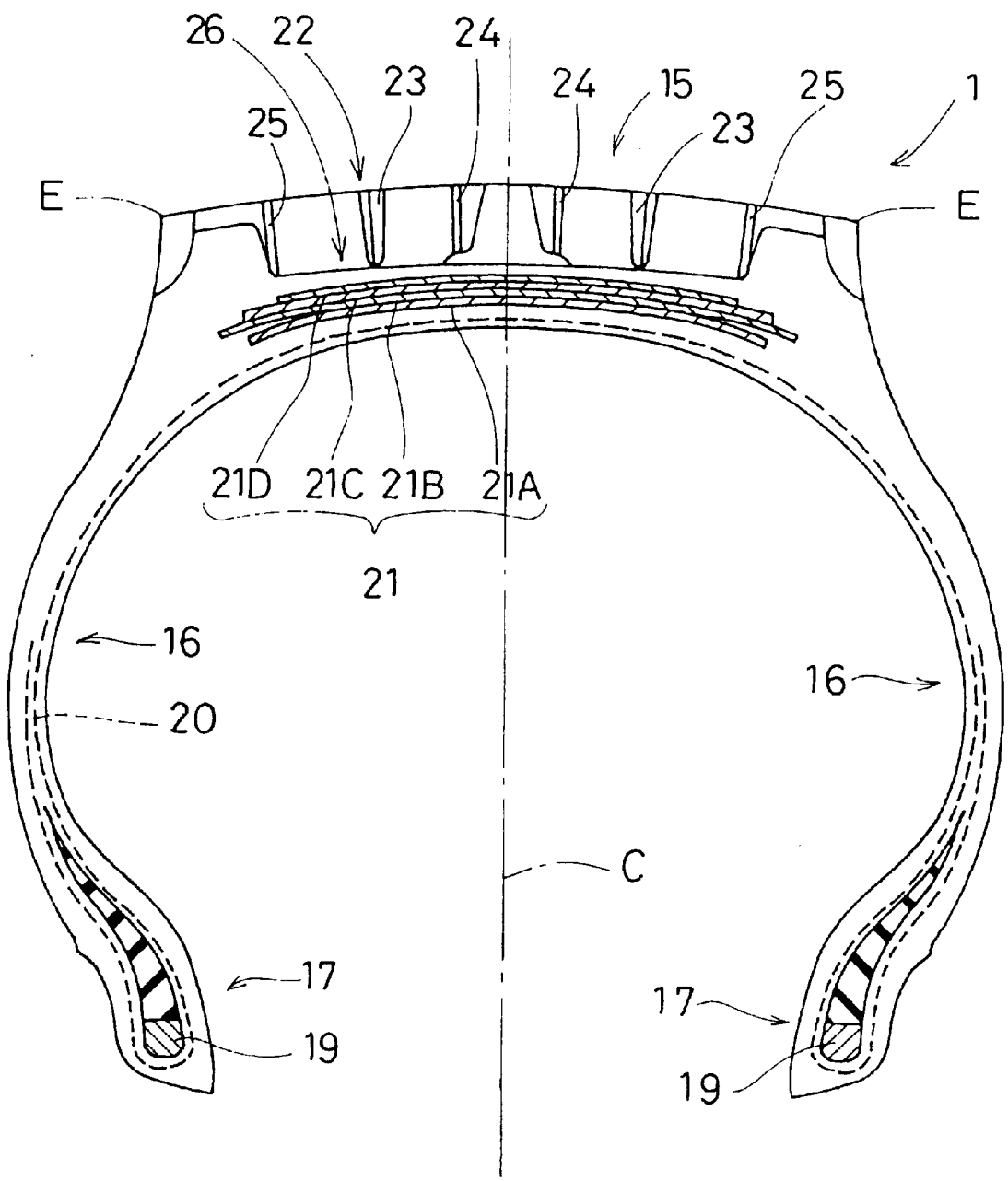
FIG. 1 is a cross sectional view of an embodiment of the present invention.

In FIG. 1, a heavy duty radial tire 1 according to the present invention comprises a tread portion 15, a pair of sidewall portions 16, a pair of bead portions 17 with a bead core 19 therein, a carcass 20 extending between the bead portions 17, and a belt 21 disposed radially outside the carcass 20 in the tread portion 15.

The carcass 20 comprises at least one radial or semiradial ply made of steel cords or organic fiber cords, e.g. polyester, aromatic polyamide rayon, nylon, and the like being arranged at an angle of from 70 to 90 degrees with respect to the tire equator C and turned up around the bead cores 19 from the axially inside to the outside of tire.

The belt 21 comprises two to four plies including at least two cross plies, each of which is made of organic fiber cords, e.g. nylon, polyester, rayon, aromatic polyamide and the like or steel cords laid in parallel with each other at a predetermined inclination angle with respect to the tire equator C. In this example, four belt plies 21A, 21B, 21C and 21D are disposed, and the cord inclining direction is reversed between the belt plies 21B and 21C.

Figure 2:
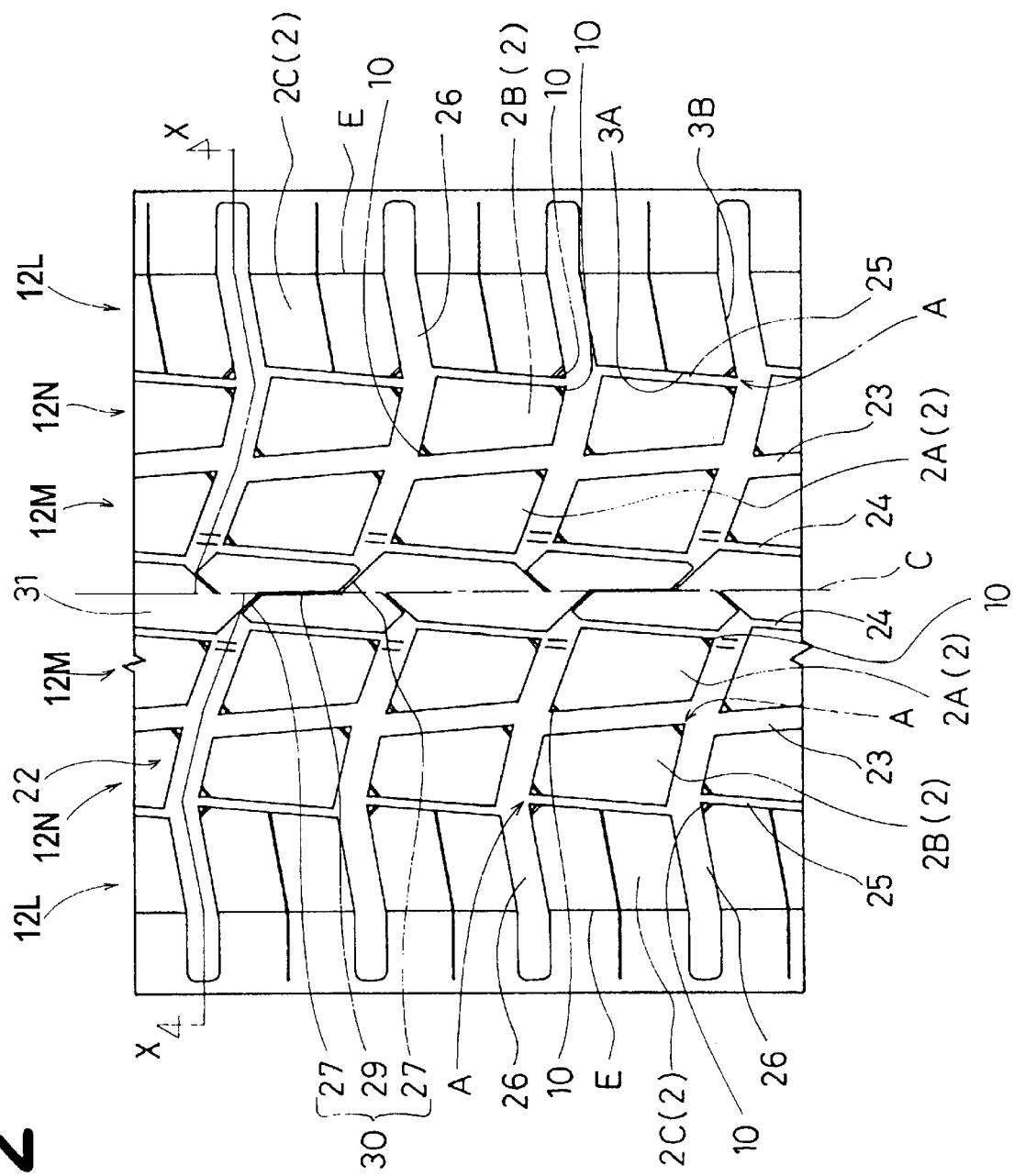
FIG. 2 is a partial developed plan view of the tire showing an example of the tread pattern.

The tread portion 15 is provided with circumferential rows 12 of blocks 2 which are divided by circumferential grooves 23, 24 and 25 and axial grooves 26, and each block 2 has acute angled corners (B). By the tread grooves 23–26, the so called block type tread pattern is formed as shown in FIG. 2, which is however only an example of the tread pattern. It is possible to employ another type of tread pattern, for example, a combination of block rows and circumferentially continuously extending ribs.

According to the present invention, a down slope 9 which becomes steeper toward the radially inside of the tire is formed on the acute angled corners (B). The downward slope 9 is substantially triangular; that is, it narrows from the edge adjoining the tread face of the block to an apex at its lower end. Preferably all the acute angled corners (B) adjoining the circumferential grooves are provided with a downward slope 9. It is however possible that some of the corners (B) are not provided with such a slope. It is also possible that all the acute angled corners existing in the tread are provided with such a slope.

In the example of FIG. 2, a pair of main grooves 23 extending continuously in the tire circumferential direction are disposed one on each side of the tire equator C; a pair of narrow grooves 24 extending continuously in the tire circumferential direction are each disposed between the tire equator C and the main grooves 23; a pair of narrow grooves 25 extending continuously in the tire circumferential direction are each disposed between the tread edge E and the main grooves 23; and axial grooves 26 extend transversely from the narrow grooves 24 to the tread edges E.

Therefore, a first row 12M of blocks 2A is formed between each of the narrow grooves 24 and the adjacent main groove 23; a second row 12N of blocks 2B is formed between each of the narrow grooves 25 and the adjacent main groove 23; a third row 12L of blocks 2C is formed between each of the narrow grooves 25 and the adjacent tread edge E; and a rib 31 extending continuously in the tire circumferential direction along the tire equator C is formed between the two narrow grooves 24.

The rib 31 is provided with sipes 27 extending from the axially inner ends of the axial grooves 26 to the tire equator C and circumferentially displaced relative to one another, and sipes 29 extending on the tire equator C between circumferentially adjacent sipes 27 to form zigzag sipes 30 as shown in FIG. 2.

The main groove 23 is staggered at the crossing points with the axial grooves 26, and the segments between the axial grooves 26 are straight and inclined in one direction. Further, in the region between the narrow grooves 24 and 25, the axial grooves 26 are substantially straight and inclined in one direction. Furthermore, in the region between the narrow groove 25 and the tread edge E, the axial grooves 26 are straight and inclined in one direction which is different from the above-mentioned direction. As a result, the blocks 2A, 2B and 2C has a trapezoidal configuration. The trapezoid of the blocks 2A is reverse to that of the blocks 2B.

Figure 3:
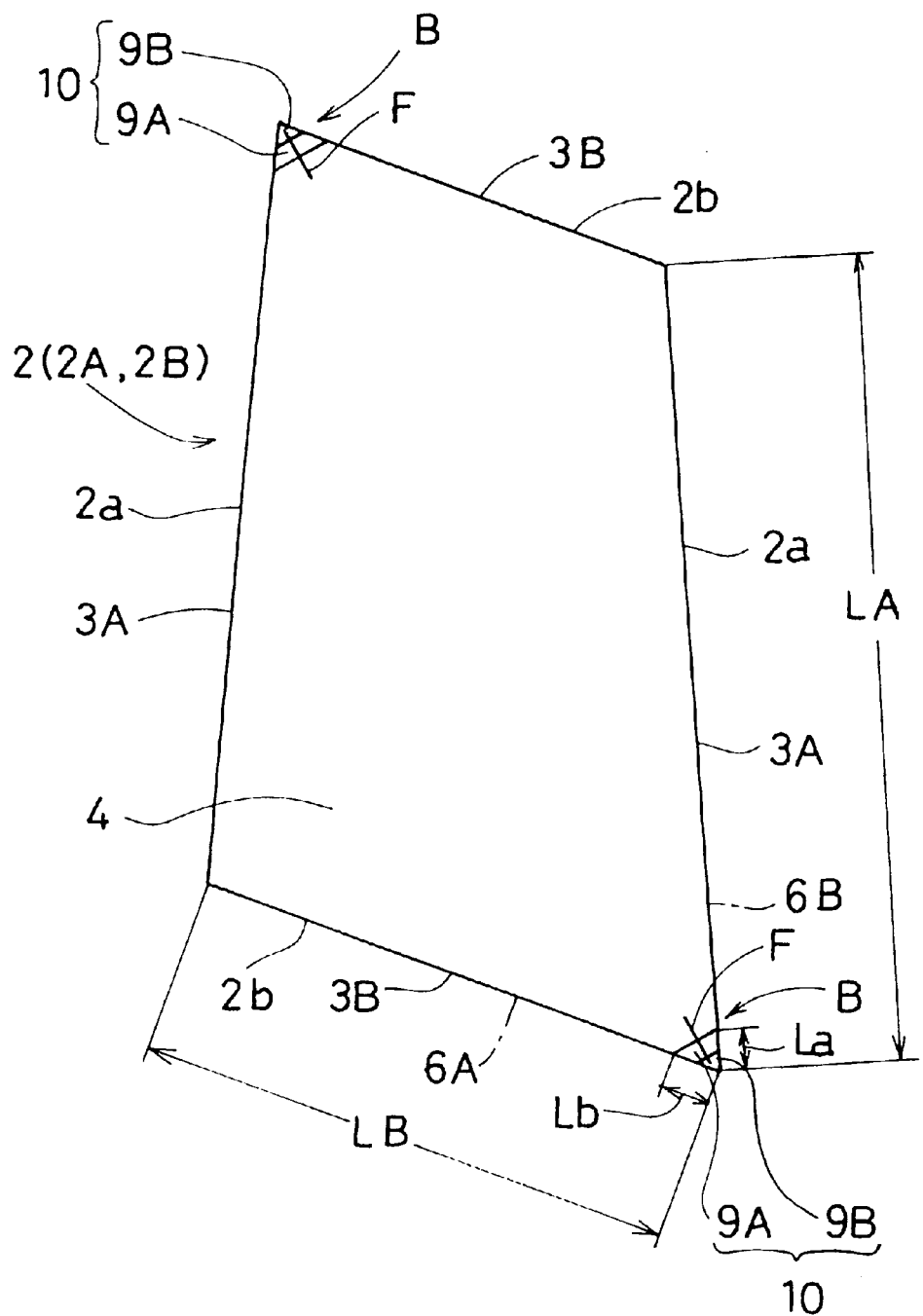
FIG. 3 is a plan view of a block.

Thus, each of the blocks is provided on each side in the circumferential direction with one acute angled corner () which is defined between a circumferentially extending edge line 3A and an axially extending edge line 3B as shown in FIG. 3.

In the example of FIG. 2, the blocks 2A and 2B are provided on all the acute angled corners (B) with the down slope 9, but the blocks 2C are provided with the down slope 9 on acute angled corners (B) on the inner side of the axial direction. The acute angled corners adjoining the tread edges are not provided with a down slope.

Figure 4:
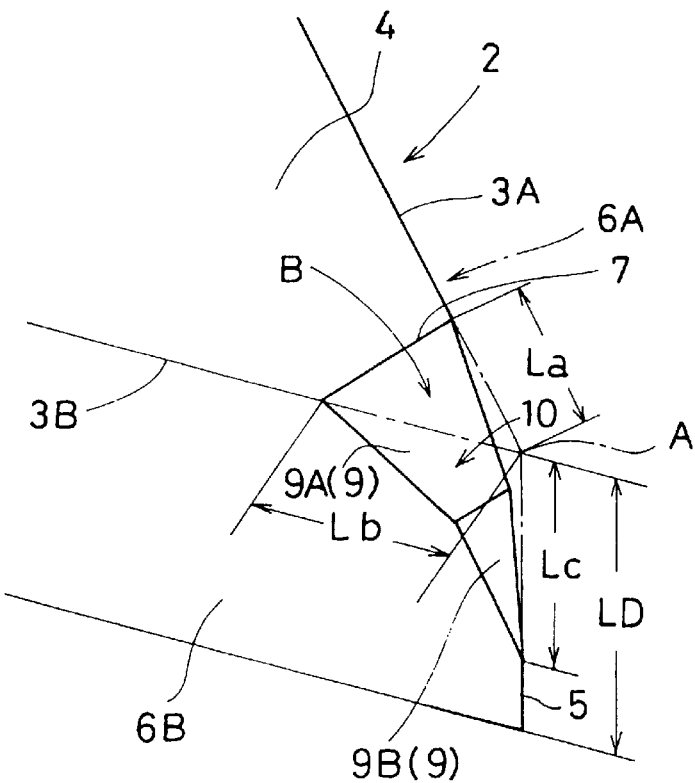
FIG. 4 is a partial perspective view of the blocks showing a corner thereof.
Figure 5:
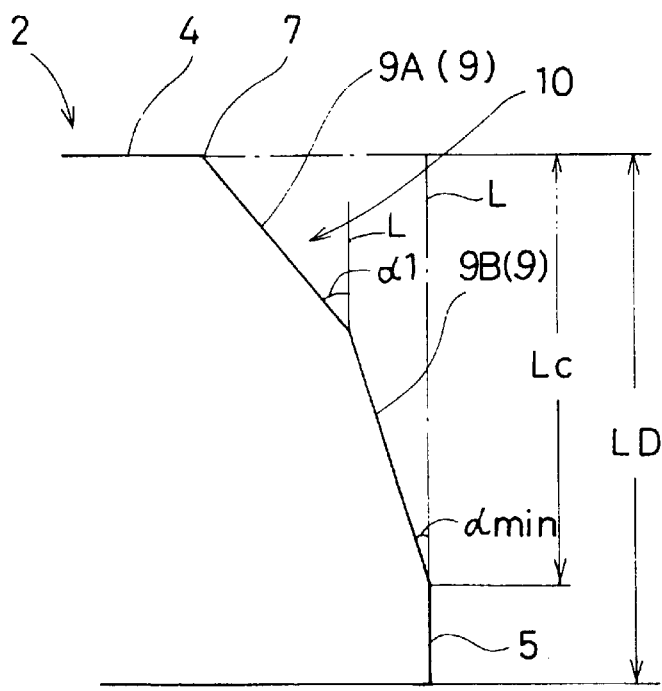
FIG. 5 is a cross sectional view showing the slope thereof.

FIGS. 4 and 5 show an example of the down slope 10. In this example, the slope 9 is a double slope composed of a radially outer gentle slope 9A and a radially inner steep slope 9B. The outer slope 9A is a trapezoidal flat plane, and the inner slope 9B is a triangular flat plane. Thus the slope 9 as a whole seems like a bent isosceles triangle.

Figure 6:
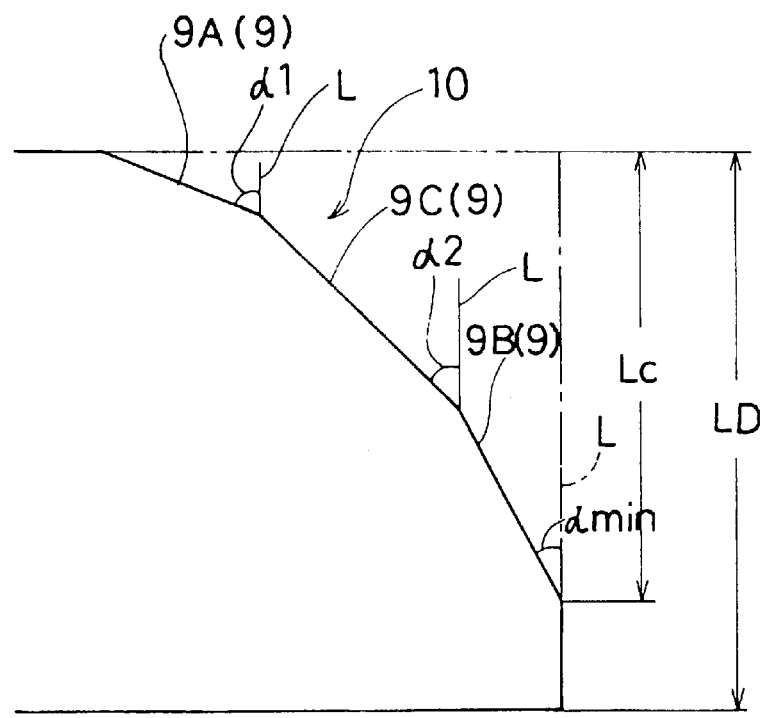
FIG. 6 is a cross sectional view showing another example of the slope.

FIG. 6 show another example of the slope 9. In this example, the slope 9 is a triple slope composed of the radially outer trapezoidal gentle slope 9A, the radially inner triangular steep slope 9B and a trapezoidal middle slopes 9C therebetween.

The slope 9 can be composed of four or more slopes.

Figure 7:
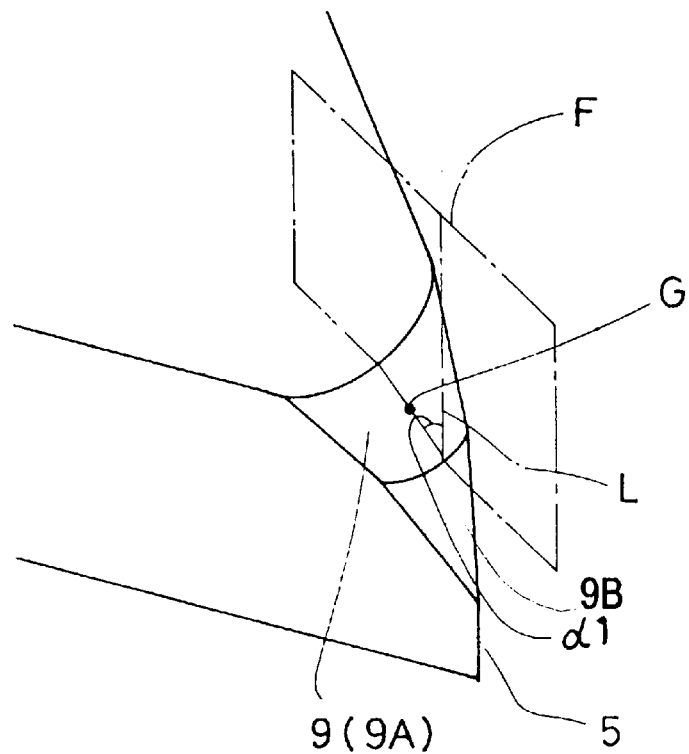
FIG. 7 is a partial perspective view of another example of the block.
Figure 8:
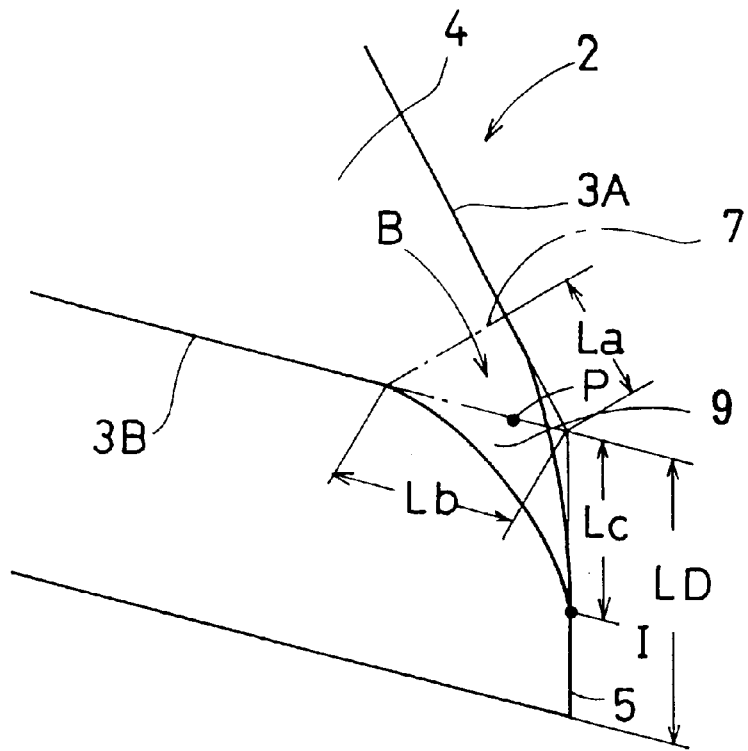
FIG. 8 is a partial perspective view of still another example of the block.
Figure 9:
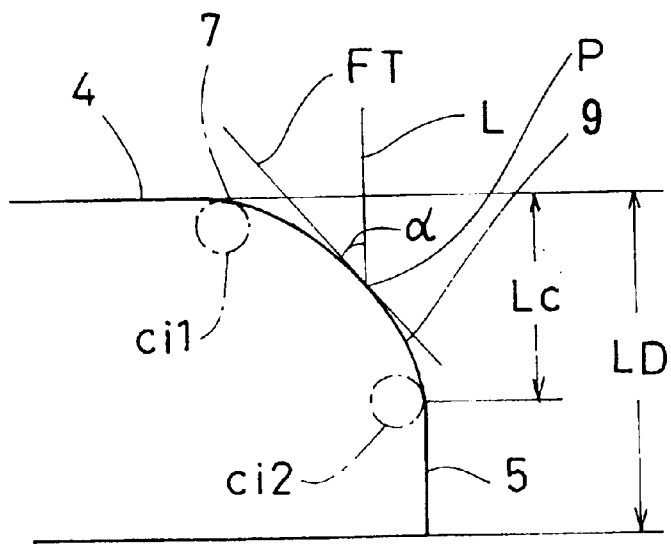
FIG. 9 is a cross sectional view showing the slope thereof
Figure 11:
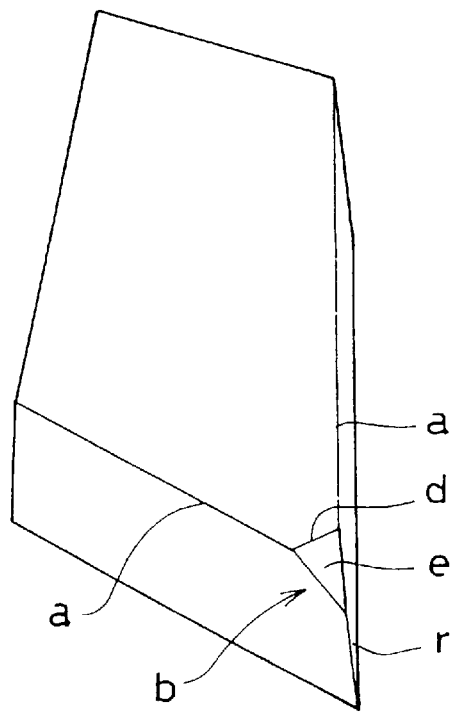
FIG. 11 is a perspective view for explaining a prior art.
Figure 12:
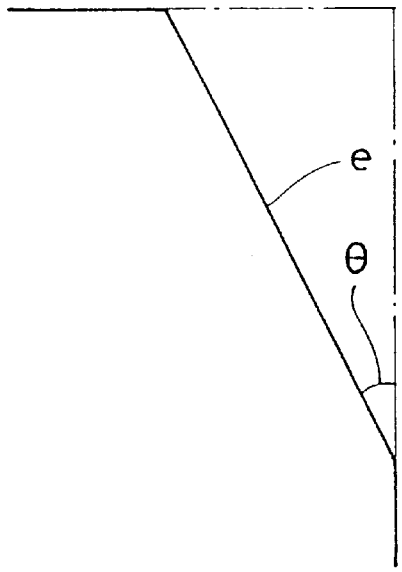
FIG. 12 is a cross sectional view showing the slope thereof.
Figure 13:
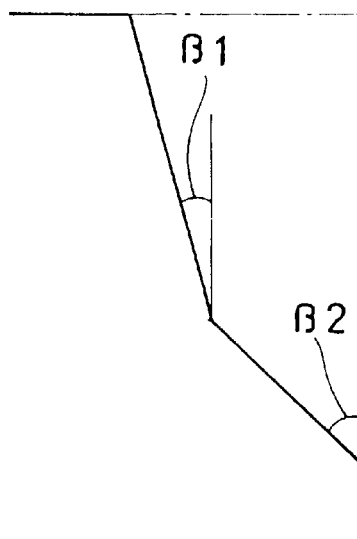
FIG. 13 is a cross sectional view showing the slope of a test tire.

FIG. 7 shows still another example of of the slope 9, which is a double slope similar to the former example of FIG. 4, but the outer and inner slopes 9A and 9B are curved from side to side to form a convex surface FIGS. 8 and 9 show still another example of the slope 9. In this example, the slope 9 becomes steeper gradually in contrast to the above-explained step-by-step change. Further, the slope 9 is straight, not curved, in a horizontal plane in contrast to FIG. 7, It is also possible that the slope 9 is curved in a horizontal plane and a perpendicular plane like a combination of the examples of FIG. 7 and FIG. 8.

In the slopes 9 in which the angle changes step-by-step, the radially inner slope 9B preferably has an inclination angle $\alpha min$ in the range of from 10 to 30 degrees. The radially outer slope 9A has an inclination angle $\alpha 1$ in the range of from 30 to 70 degrees. In case of a double slope, the angle $\alpha 1$ is preferably in the range of from 30 to 50 degrees. In case of a triple slope, preferably, the angle $\alpha 1$ is in the range of from 50 to 70 degrees, and the middle slope 9C has an inclination angle $\alpha 2$ in the range of from 30 to 50 degrees.

In case of the curved slope of FIG. 8, the inclination angle a gradually changes from substantially 90 degrees at the top to substantially 0 degree at the radially inner end point I.

Based on the above-explained angle change, the dimensions of the cut-off rubber, that is, the size of the slope 9 is defined as follows.

First, as shown in FIGS. 3–9, a point (A) and distances La, Lb and Lc relating to the slope size are defined beforehand. Referring to FIG. 4, the point (A) is an intersecting point of the three edge lines 3A, 3B and 5 of the block 2. The distance La is between the point (A) and an intersecting point of the line 3A and the upper edge 7 of the slope 9. The distance Lb is between the point (A) and an intersecting point of the line 3B and the upper edge 7 of the slope 9. The distance Lc is a radial distance between the point (A) and the radially inner extreme end of the slope 9.

In other words, the distance Lc is the radial extent of the slope 9. The distance La is a distance between the radially inner extreme end of the slope 9 and the intersecting point of the edge line 3A and the upper edge 7 which distance is projected on the tread face. The distance Lb is a distance between the radially inner extreme end of the slope 9 and the intersecting point of the edge line 3B and the upper edge 7 which distance is projected on the tread face.

The distances La and Lb are preferably set in the range of from 1 to 10 mm, more preferably 3 to 6 mm. If the distances La and Lb are less than 1 mm, it becomes difficult to obtain the required resistance to uneven wear and tear-off. If the distances La and Lb are more than 10 mm, not only is the wet performance liable to be deteriorate but also the tread pattern becomes a bad image. For a similar reason, the distance La is preferably set in the range of from 0.05 to 0.15 times the block edge length LA, and the distance Lb is preferably set in the range of from 0.10 to 0.30 times the block edge length LB.

The distance Lc is preferably set in the range of from 0.25 to 0.50 times the blocks height LD and in the range of from 5 to 13 mm. If Lc is less than 5 mm or Lc/LD is less than 0.25, it becomes difficult to obtain the required resistance to uneven wear and tear-off. If Lc is more than 13 mm or Lc/LD is more than 0.50, not only is the wet performance liable to deteriorate but also the tread pattern becomes a bad image.

The above-mentioned inclination angles $\alpha$, $\alpha 1$, $\alpha 2$, $\alpha min$ of the slopes 9 are defined as an angle of a tangential line to the slope 9 measured with respect to a perpendicular line L, wherein both the lines are in a perpendicular plane F which is at a right angle to the slope 9 in a horizontal plane.

If the angle $\alpha$ is less than the above-mentioned range, the resistance to uneven wear and tear-off is liable to decrease. If the angle $\alpha$ is over the above-mentioned range, the resistance to uneven wear and tear-off and tread pattern's image becomes worse.

Comparison Tests

Test tires of size 285/75R24.5 having the same internal structure shown in FIG. 1 and tread pattern in FIG. 2 were made and tested. The carcass was composed of a single radial ply of steel cords (3/0.20+7/0.23), and the belt was composed of four plies of steel cords (1×3/0.20+6/0.35). The other specifications and test results are shown in Table 1.

1) Tread pattern's image test

The tread pattern's image was evaluated into five ranks (larger is better) on the basis of a feeling whether the acute angle corners are seems to be sharp or dull.

2) Resistance to uneven wear test

A 2-D·D truck provided on the rear wheels with test tires was run for 100,000 km on dry paved roads. Then the average of the maximum wear of the blocks 2A and 2B was obtained and ranked as follows.

Rim size:8.25×24.5, Tire load:2800 kg, Inner pressure:7.5 kgf/sq.cm

| Rank | Wear (mm) |
|------|-----------|
| 5+ | 0–0.4 |
| 5– | 0.5–0.9 |
| 4+ | 1–1.4 |
| 4– | 1.5–1.9 |
| 3+ | 2–2.4 |
| 3– | 2.5–2.9 |
| 2 | 3–4.9 |
| 1 | 5– |

3) Wet performance test

The time necessitated to make a predetermined number of turns in a wet basalt stone paved circular test course was measured and ranked into five ranks (larger is better).

4) Resistance to tear-off test

After the above test 3), the blocks are examined whether the blocks were torn off or not, and the size of the torn-off rubber was evaluated and the number of torn-off corners was counted as follows.

| Rank | Size (mm) | Number |
|------|-----------|--------|
| 1 | over 7 × 7 × 7 | 20– |
| 2 | over 7 × 7 × 7 | 6–19 |
| 3– | over 7 × 7 × 7 | 3–5 |
| 3+ | over 7 × 7 × 7 | 1–2 |
| 4– | over 3 × 3 × 3 | 9– |
| 4+ | over 3 × 3 × 3 | 6–8 |
| 5– | over 3 × 3 × 3 | 3–5 |
| 5+ | over 3 × 3 × 3 | 0–2 |

It was confirmed that the example tires according to the present invention were improved in the performance as a whole in comparison with the reference tires.

As described above, in the heavy duty radial tire according to the present invention, the resistance to uneven wear and tear-off, wet performance, and pattern's image can be improved in a well balanced manner.

TABLE 1

| | Example | | | | | | | | | | | | | | | |
|---|---|---|---|---|---|---|---|---|---|---|---|---|---|---|---|---|
| Tire | 1 | 2 | 3 | 4 | 5 | 6 | 7 | 8 | 9 | 10 | 11 | 12 | 13 | 14 | 15 | 16 |
| Slope (FIG. No.) | 5 | 5 | 5 | 5 | 5 | 5 | 5 | 5 | 5 | 5 | 5 | 5 | 5 | 5 | 5 | 5 |
| Number | 2 | 2 | 2 | 2 | 2 | 2 | 2 | 2 | 2 | 2 | 2 | 2 | 2 | 2 | 2 | 2 |
| Angle | | | | | | | | | | | | | | | | |
| $\alpha 1$ (deg) | 39 | 56 | 27 | 30 | 39 | 39 | 39 | 39 | 56 | 56 | 33 | 45 | 27 | 27 | 56 | 56 |
| $\alpha 2$ (deg) | — | — | — | — | — | — | — | — | — | — | — | — | — | — | — | — |
| $\alpha$min (deg) | 16 | 37 | 14 | 22 | 16 | 16 | 16 | 16 | 37 | 37 | 14 | 37 | 9 | 11 | 37 | 37 |
| $\theta$ (deg) | — | — | — | — | — | — | — | — | — | — | — | — | — | — | — | — |
| $\beta 1$ (deg) | — | — | — | — | — | — | — | — | — | — | — | — | — | — | — | — |
| $\beta 2$ (deg) | — | — | — | — | — | — | — | — | — | — | — | — | — | — | — | — |
| La (mm) | 3 | 6 | 2 | 3 | 6 | 1 | 2 | 7 | 6 | 6 | 2 | 6 | 2 | 2 | 9 | 11 |
| Lb (mm) | 3 | 6 | 2 | 3 | 6 | 1 | 2 | 7 | 6 | 6 | 2 | 6 | 2 | 2 | 9 | 11 |
| Lc (mm) | 6 | 6 | 6 | 6 | 12 | 6 | 6 | 6 | 4 | 14 | 6 | 6 | 6 | 6 | 6 | 6 |
| Pattern's image | 5 | 4 | 5 | 4 | 4 | 5 | 5 | 4 | 4 | 4 | 4 | 5 | 5 | 5 | 4 | 4 |
| Uneven wear | 5+ | 5– | 4– | 4+ | 5+ | 4– | 4+ | 5+ | 4+ | 5+ | 5+ | 5+ | 3+ | 4– | 4– | 4+ |
| Wet performance | 5 | 5 | 5 | 4 | 4 | 5 | 5 | 4 | 5 | 4 | 5 | 4 | 5 | 5 | 5 | 4 |
| Tear-off | 5+ | 5– | 4– | 4+ | 5+ | 4– | 4+ | 5+ | 4+ | 5+ | 5+ | 5+ | 3+ | 4– | 4– | 4+ |

| | Example | | | | | | | | | | Reference | | | | | |
|---|---|---|---|---|---|---|---|---|---|---|---|---|---|---|---|---|
| Tire | 17 | 18 | 19 | 20 | 21 | 22 | 23 | 24 | 25 | 26 | 1 | 2 | 3 | 4 | 5 | 6 |
| Slope (FIG. No.) | 6 | 6 | 6 | 6 | 6 | 6 | 6 | 6 | 6 | 9 | 12 | 12 | 12 | 12 | 13 | 10 |
| Number | 3 | 3 | 3 | 3 | 3 | 3 | 3 | 3 | 3 | | 1 | 1 | 1 | 1 | 2 | 0 |
| Angle | | | | | | | | | | | | | | | | |
| $\alpha 1$ (deg) | 68 | 45 | 35 | 55 | 75 | 45 | 68 | 68 | 35 | — | — | — | — | — | — | — |
| $\alpha 2$ (deg) | 45 | 27 | 19 | 27 | 45 | 33 | 55 | 45 | 19 | — | — | — | — | — | — | — |
| $\alpha$min (deg) | 27 | 18 | 11 | 18 | 27 | 18 | 27 | 33 | 9 | — | — | — | — | — | — | — |
| $\theta$ (deg) | — | — | — | — | — | — | — | — | — | — | 27 | 27 | 7 | 63 | — | — |
| $\beta 1$ (deg) | — | — | — | — | — | — | — | — | — | — | — | — | — | — | 14 | — |
| $\beta 2$ (deg) | — | — | — | — | — | — | — | — | — | — | — | — | — | — | 45 | — |
| La (mm) | 6 | 3 | 2 | 3 | 6 | 3 | 6 | 6 | 2 | 6 | 3 | 6 | 2 | 6 | 3 | — |
| Lb (mm) | 6 | 3 | 2 | 3 | 6 | 3 | 6 | 6 | 2 | 6 | 3 | 6 | 2 | 6 | 3 | — |
| Lc (mm) | 6 | 6 | 6 | 6 | 6 | 6 | 6 | 6 | 6 | 6 | 6 | 12 | 12 | 3 | 6 | — |
| Pattern's image | 4 | 4 | 5 | 4 | 4 | 4 | 4 | 4 | 5 | 5 | 4 | 3 | 5 | 4 | 4 | 5 |
| Uneven wear | 5+ | 4+ | 3+ | 4– | 4+ | 5– | 4+ | 5– | 3– | 5+ | 3+ | 4+ | 2 | 2 | 3+ | 1 |
| Wet performance | 5 | 5 | 5 | 5 | 5 | 5 | 5 | 5 | 5 | 5 | 4 | 3 | 5 | 5 | 3 | 5 |
| Tear-off | 5+ | 4+ | 3+ | 4– | 4+ | 5– | 4+ | 5– | 3– | 5+ | 3+ | 4+ | 2 | 2 | 3+ | 1 |

What is claimed is:

1. A heavy duty radial tire comprising:

a tread portion provided with blocks having acute angled corners between a pair of edge lines, the acute angled corners being provided with a substantially triangular downward slope comprising a radially outer trapezoidal flat plane and a radially inner triangular flat plane being steeper than the radially outer trapezoidal flat plane.

2. The heavy duty radial tire according to claim 1, wherein the size of the slope is 1 to 10 mm along one of said pair of edge lines, 1 to 10 mm along the other of said pair of edge lines, and 5 to 13 mm in the radial direction of the tire.

3. The heavy duty radial tire according to claim 1, wherein:

the radially outer trapezoidal flat plane is inclined at an angle of from 30 to 70 degrees with respect to the radial direction; and the radially inner triangular flat plane is inclined at an angle of from 10 to 30 degrees with respect to the radial direction.

4. The heavy duty radial tire according to claim 3, wherein the size of the slope is 1 to 10 mm along one of said pair of edge lines, 1 to 10 mm along the other of said pair of edge lines, and 5 to 13 mm in the radial direction of the tire.

5. A heavy duty radial tire comprising:

a tread portion provided with blocks having acute angled corners between a pair of edge lines, the acute angled corners being provided with a substantially triangular downward slope comprising a radially outer face and a radially inner face being steeper than the radially outer face, and each of the radially outer face and the radially inner face being curved from side to side to form a convex surface.

6. The heavy duty radial tire according to claim 5, wherein the size of the slope is 1 to 10 mm along one of said pair of edge lines, 1 to 10 mm along the other of said pair of edge lines, and 5 to 13 mm in the radial direction of the tire.

7. The heavy duty radial tire according to claim 5, wherein:

the radially outer face is inclined at an angle of from 30 to 70 degrees with respect to the radial direction; and the radially inner face is inclined at an angle of from 10 to 30 degrees with respect to the radial direction.

8. The heavy duty radial tire according to claim 7, wherein the size of the slope is 1 to 10 mm along one of said pair of edge lines, 1 to 10 mm along the other of said pair of edge lines, and 5 to 13 mm in the radial direction of the tire.

9. A heavy duty radial tire comprising:

a tread portion provided with blocks having acute angled corners between a pair of edge lines, the acute angled corners being provided with a substantially triangular downward slope comprising a radially outer trapezoidal flat plane, a radially inner trapezoidal flat plane being steeper than the radially outer trapezoidal flat plane, and a radially innermost triangular flat plane being steeper than the radially inner trapezoidal flat plane.

10. The heavy duty radial tire according to claim 9, wherein the size of the slope is 1 to 10 mm along one of said pair of edge lines, 1 to 10 mm along the other of said pair of edge lines, and 5 to 13 mm in the radial direction of the tire.

11. The heavy duty radial tire according to claim 9, wherein:

the radially outer trapezoidal flat plane is inclined at a first angle of from 30 to 70 degrees with respect to the radial direction; and the radially innermost triangular flat plane is inclined at a second angle of from 10 to 30 degrees with respect to the radial direction; and the radially inner trapezoidal flat plane is inclined at a third angle between the first and second angles.

12. The heavy duty radial tire according to claim 11, wherein the size of the slope is 1 to 10 mm along one of said pair of edge lines, 1 to 10 mm along the other of said pair of edge lines, and 5 to 13 mm in the radial direction of the tire.

* * * * *